P. MANNY.
Subsoil Plow.
No. 14,726.
Patented April 22, 1856.
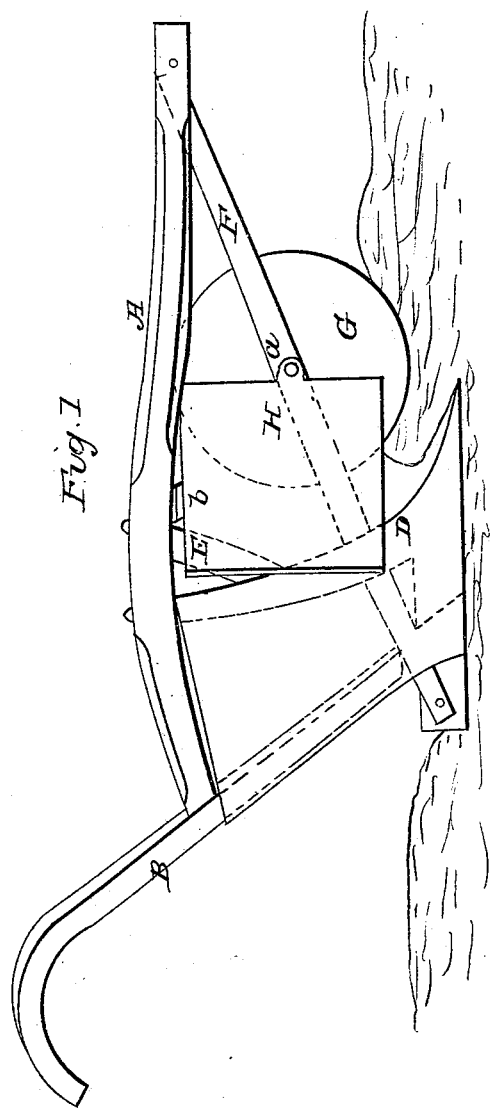
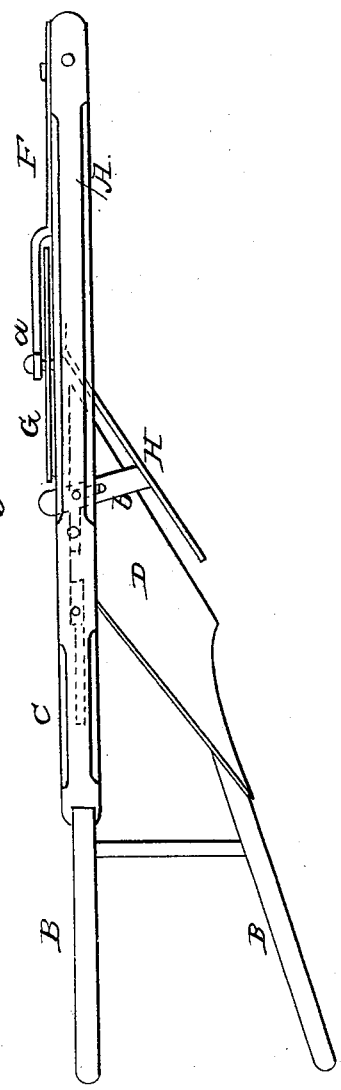

UNITED STATES PATENT OFFICE.

PELLS MANNY, OF WADDAM'S GROVE, ILLINOIS.

IMPROVEMENT IN SUBSOIL-PLOWS.

Specification forming part of Letters Patent No. 14,726, dated April 22, 1856.

*To all whom it may concern:*

Be it known that I, PELLS MANNY, of Waddam's Grove, in the county of Stephenson and State of Illinois, have invented a new and Improved Subsoil-Plow; and I do hereby declare that the following is a full, clear, and exact description of the same, reference being had to the annexed drawings, making a part of this specification, in which—

Figure 1 is a side view of my improvement. Fig. 2 is a plan or top view of the same.

Similar letters of reference indicate corresponding parts in the two figures.

My invention consists in the combination of a circular rotating colter, separating-wing, mold-board, and bar, arranged as will be hereinafter fully shown and described.

To enable those skilled in the art to fully understand and construct my invention, I will proceed to describe it.

A represents the beam of the plow, B B the handles, C the landside, D the mold-board, and E the standard. These parts are constructed and put together in the usual way, and therefore do not require a minute description.

F is a bar, one end of which is attached to the front end of the beam A and the opposite end to the back part of the landside C, as shown clearly in Fig. 1. This bar gives great strength to the plow without adding materially to its weight.

G is a circular colter, which works or turns on an axis, *a*, in the bar F, and H is a separating-wing, the front end of which is attached to the bar F, and the back part is connected to the beam A by an arm, *b*. The separating-wing has relatively an oblique or angular position with the beam A, the back part of the wing projecting outward from it, as shown clearly in Fig. 1.

The colter is a short distance in advance of the separating-wing, and the separating-wing is placed in advance of the subsoil mold-board. The separating-wing does not extend down as far as the mold-board.

As the implement is drawn along the colter G, as it rotates, cuts the furrow-slice in advance of the separating-wing. The separating-wing spreads or opens the furrow of the surface-soil, while the mold-board D throws up the subsoil to the top of the ground, the mold-board being sufficiently narrow to take up only half of the subsoil at each plowing, and being relieved from the weight of the top or surface soil by the action of the separating-wing. It has such advantages in the draft as to enable it to take a much deeper furrow than ordinary subsoil-plows.

Having thus described my invention, what I claim as new, and desire to secure by Letters Patent, is—

The combination of the circular rotating colter G, separating-wing H, mold-board D, and bar F, arranged substantially as shown and described.

PELLS MANNY.

Witnesses:
JOHN A. CLARK,
ROBERT FERGUSON.